United States Patent [19]

Hemon

[11] Patent Number: 5,731,677
[45] Date of Patent: Mar. 24, 1998

[54] INTEGRATED CIRCUIT FOR CONTROLLING AN INFORMATION STORAGE DISK

[76] Inventor: Erwan Hemon, 10, rue de la Défense Passive, 14000 Caen, France

[21] Appl. No.: 672,018

[22] Filed: Jun. 24, 1996

[30] Foreign Application Priority Data

Jul. 19, 1995 [FR] France .................. 95 08734

[51] Int. Cl.⁶ .............. H02P 6/02; H02P 1/18; H02K 29/00
[52] U.S. Cl. ............ 318/561; 318/560; 318/138; 318/254; 360/73.01
[58] Field of Search ................ 318/138, 139, 318/245, 254, 377, 368, 561, 560, 439; 360/105, 107, 72-89, 97.01, 77, 78; 388/809; 361/20-25

[56] References Cited

U.S. PATENT DOCUMENTS

| | | | |
|---|---|---|---|
| Re. 35,469 | 3/1997 | Ueki | 318/138 |
| 4,623,943 | 11/1986 | Osada et al. | 360/78 |
| 4,638,384 | 1/1987 | Stewart et al. | 360/77 |
| 4,786,995 | 11/1988 | Stupeck et al. | 360/75 |
| 4,812,929 | 3/1989 | Stewart et al. | 360/77.07 |
| 4,831,469 | 5/1989 | Hanson et al. | 318/254 |
| 4,866,554 | 9/1989 | Stupeck et al. | 360/105 |
| 4,922,169 | 5/1990 | Freeman | 318/254 |
| 5,384,675 | 1/1995 | Crawforth et al. | 360/75 |
| 5,486,957 | 1/1996 | Albrecht | 360/75 |
| 5,504,402 | 4/1996 | Menegoli | 318/377 |
| 5,557,183 | 9/1996 | Bates et al. | 318/434 |
| 5,569,990 | 10/1996 | Dunfield | 318/254 |

OTHER PUBLICATIONS

Williams et al., "A Fully Integrated HDD Power IC with Novel Head Retract Feature", IEEE Catalog No. 94CH3377-9, Session 8, Article 8.4, 6th Intl. Symposium on Pwer Semiconductor Devices & Integrated Circuits, May 31-Jun. 2, 1994, pp. 391-396.

*Primary Examiner*—Paul Ip

[57] ABSTRACT

A circuit which energizes a disk drive motor via three branches U, V, W each including 2 switching elements in series and which energizes an actuator for the displacement of the read-write heads via two branches each including 2 switching elements, which circuit comprises isolating devices to allow energization by the drive motor operating as a generator, for a withdrawal of the heads to a safe position during a supply voltage cut.

9 Claims, 3 Drawing Sheets

INTEGRATED CIRCUIT FOR CONTROLLING AN INFORMATION STORAGE DISK

BACKGROUND OF THE INVENTION

The present invention relates to an integrated circuit for controlling an information storage apparatus comprising a rotary disk, circuit managing on the basis of a supply voltage and a reference voltage, a sequential central of the phases of a three-phase brushless motor which provides the rotary drive for the disk, and managing the positioning of an actuator for moving the read-write heads of the disk, the circuit comprising a plurality of power switching elements arranged along the periphery of a semiconductor chip on which said circuit is integrated, which elements are arranged so as to form:

three branches U, V, W, each comprising two switching elements in series, which energize each of the phases of the drive motor via the intermediate nodes between said elements of these branches, and two branches P and N, each comprising two switching elements in series, which energize the head actuator via the intermediate nodes between said elements of these branches, which circuit further comprises at least one isolating device connected between the supply voltage and one branch of switching elements to allow the heads to withdraw to a safe position in the case of a cut in the supply voltage, the head actuator then being energized by means of the electric energy generated by the disk drive motor.

An integrated circuit intended for controlling the power supply of a hard disk motor is known from the article by R. K. Williams et al. entitled "A Fully Integrated HDD Power IC with Novel Head Retract Feature" published under IEEE catalog no. 94CH3377-9, which is a report of session no. 8, article 8.4, of the 6th International Symposium on Power Semiconductor Devices and Integrated Circuits, held in Davos, Switzerland, 31 May–2 Jun. 1994.

This article describes more particularly a control circuit which operates with a supply voltage of 5 V. A control circuit taking the form of an integrated circuit enables to simplify the construction of the storage apparatus, to improve its performance, and to reduce its dimensions and cost. The technical evolution of information storage apparatuses with rotary disks such as magnetic disks or optically scanned discs, is clearly directed towards an increase in the rotation speed of the disk, in order to raise the transfer rate of the data to be stored or read, and towards a reduction of the time required by the heads to reach their operating position. Consequently, the power control of the apparatus should be capable of delivering increasingly larger peak currents, currently of the order of one ampere.

In order to optimize the power dissipation, a control circuit should be designed so as to minimize undesirable resistances in series with the power supply of the motors of the apparatus. These undesirable resistances include the internal resistances of the power transistors used and the resistance of the internal connections of the integrated circuit.

As a result of their length, the conductor tracks leading to the contact pads, which are connected to pins carried by the housing of the circuit, have an electrical resistance which is not to be ignored and which should be reduced to a minimum. It is therefore necessary to arrange the power switching elements in the direct proximity of the contact pads and, as a consequence, at the periphery of the semiconductor chip.

SUMMARY OF THE INVENTION

It is an object of the invention to provide a control circuit in which all the power switching elements can be arranged in an optimum manner in view of a reduction of undesirable parasitic resistances. This circuit should, in particular, allow these elements to be arranged in such a manner that none of the various power supply paths has a distinctly higher resistance than any other one of these power supply paths.

The invention provides a special circuit layout which enables these requirements to be met at least to a large extent.

According to the present invention an integrated circuit of the type defined in the opening paragraph is characterized in that an eleventh switching element functioning as an isolating device is connected between a first supply terminal and the coupled ends of the two branches U and V, a twelfth switching element functioning as an isolating device is connected between a second supply terminal and an end of the branch W which has been coupled to an end of the branch N, a third supply voltage terminal is connected directly to one end of the remaining branch P, the other end of the branch N and the other end of the branch P are connected together to a reference terminal of the circuit, the other end of said branch U is connected to a first connection terminal of the circuit, while the other end of the branch V and the other end of the branch W are connected together to a second connection terminal of the circuit, which first and which second connection terminal are to be brought at a voltage near the reference voltage.

The invention uses isolating devices in the form of active semiconductor switching elements having a low resistance in the conductive state, thereby enabling the voltage drops in such devices to be reduced. As a matter of fact, isolating devices are indispensable in order to avoid that, during the withdrawal of the heads to the safe position no coupling occurs to the supply voltage line, which is then at zero voltage. As already mentioned, it is then desired to use the electromotive force developed at the windings of the drive motor to energize the head actuator during the time required to withdraw the heads.

The invention advantageously utilizes the fact that no isolating device is needed for one of the power supply branches of the head actuator: i.e. the one which should supply the reference voltage during the withdrawal of the heads to the safe position. Thus, there is a direct connection from the branch referenced P to a supply terminal referred to as the third supply terminal. According to the invention, the second supply terminal is connected both to the other supply branch of the actuator, referred to as the branch N, and to one of the supply branches of the drive motor, i.e. the branch W. This arrangement enables the power switching elements to be arranged uninterruptedly along the periphery of the semiconductor chip, as will be described in more detail hereinafter.

In a preferred embodiment of the invention the node coupling the eleventh switching element to the branches U and V is connected to a third connection terminal of the circuit, and the node coupling the twelfth switching element to the branches W and N is connected to a fourth connection terminal of the circuit, which terminal is to be connected to the third connection terminal by a connection external to the integrated circuit.

In this way a parallel supply of current to the relevant branches is obtained from the first and the second supply terminal via two parallel switching elements which serve as isolating devices. Such a parallel supply reduces the required maximum current ratings of the parallel elements. This makes it possible to reduce the dimensions of these elements, if desired.

To energize the head actuator during the withdrawal of the heads to the safe position, the branch P should supply a voltage equal to the reference voltage via its intermediate node, which is simply achieved by forcing into conduction the appropriate one of the two switching elements of this branch. On the other hand, the branch N should then supply a current obtained from the windings of the drive motor, which operates as a generator. For this purpose, a conduction command may be applied to that switching element of the branch N which is adjacent the end of the branch W. However, this solution requires the use of two different commands for this elements, depending on whether the apparatus is in normal operation or is in the head withdrawal phase after the power supply has been cut.

Therefore, in a variant of the invention which is advantageous because of its simplicity, the node coupling the twelfth switching element to the coupled ends of the branches W and N is coupled to the intermediate node between the elements of the branch N via the current path of an additional switching element under the influence of a command which causes its conduction only during the withdrawal of the heads until the disk has stopped.

Although the power switching elements may take different forms, they are preferably formed by N-channel DMOS transistors. This is the best type of transistor to satisfy the stringent requirements imposed by this kind of application, particularly as regards the voltage stability in the non-conductive state when apparatuses operating at 12 V are to be controlled, and a low resistance in the conductive state.

The transistor forming the additional switching element, called thirteenth transistor, can be smaller than the other transistors already mentioned because the current through this transistor is less important.

In an advantageous variant of the invention a braking function for the disk drive motor can be achieved, for which the conduction command for the third transistor is modulated so as to obtain a first conduction with a controlled voltage during the time necessary for the withdrawal of the heads to the safe position, after which this command is changed to place the transistor in a highly conductive state.

BRIEF DESCRIPTION OF THE DRAWINGS

Other special features, details and advantages of the invention will become apparent from the following description with reference to the accompanying drawings, given by way of non-limitative examples and in which.

DETAILED DESCRIPTION OF THE PREFERRED EMBODIMENT

Figure 1:
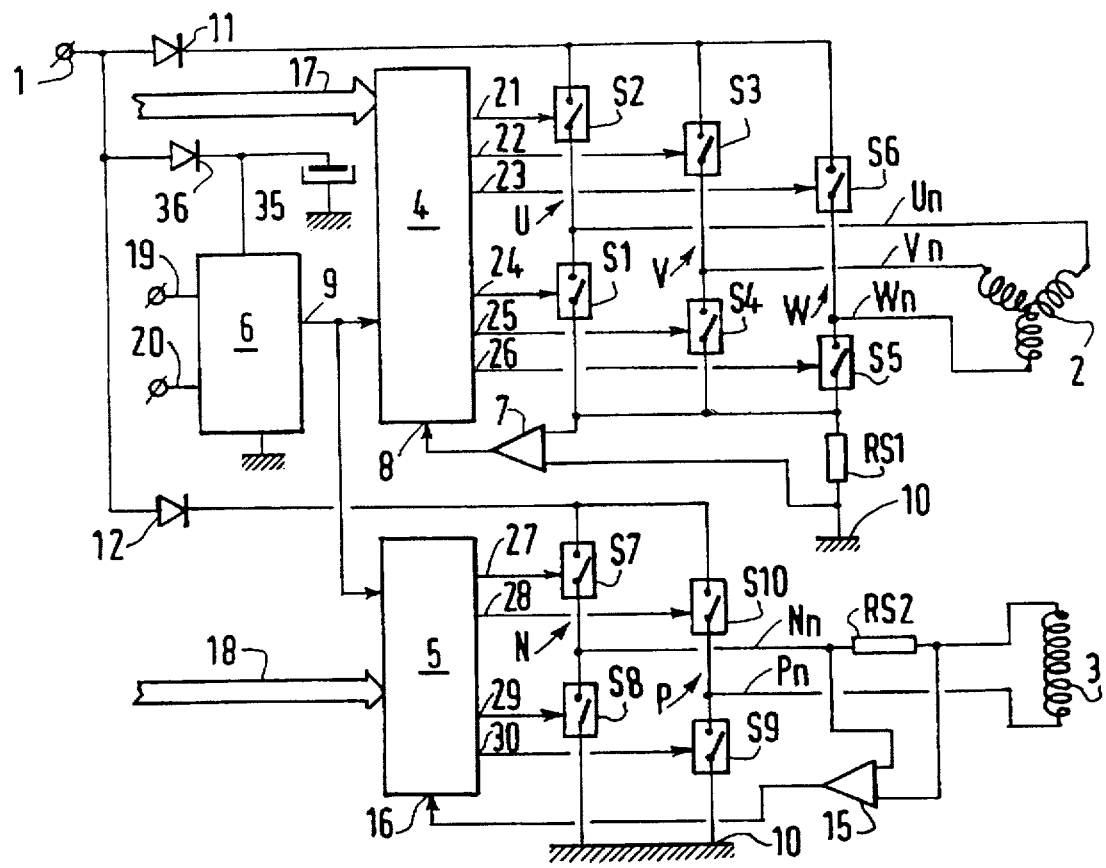
FIG. 1 is a functional diagram with the aid of which the principal monitoring and power control circuits of a conventional information storage apparatus can be described.

The power control circuits of a conventional information storage apparatus will now be described in brief with reference to FIG. 1. A disk drive motor 2 and an actuator 3 for moving the read-write heads are energized from a positive supply line 1 at, for example, 12 V, by push-pull power output stages. The three phases of the three-phase brushless typemotor 2 are powered by means of three branches U, V and W each including two switching elements S1, S2; S3, S4; S5, S6, respectively, in series. The nodes between the elements forming the branches U, V and W bear the references Un, Vn and Wn.

The power output stage formed by the branches U, V and W is controlled by an analogic control circuit 4 for the drive motor, which circuit supplies suitable control signals to the switching elements S1 to S6 via connections 21 to 26, so as to obtain a given speed of rotation of the motor 2.

The phases are biassed to the reference voltage 10 via a resistor RS1 common to the three phases, which resistor of low resistance value serves for controlling the value of the current flowing through the motor 2. After amplification by an amplifier 7 the voltage produced across this resistor 10 is applied to an input 8 of the control circuit 4.

The head actuator 3 is energized by another power output stage of the bridge type, comprising two branches N and P each having two switching elements S7, S8; S9, S10, respectively, in series. The nodes between the elements forming the branches N and P are referenced Nn and Pn, respectively.

In the present case, the actuator 3 is biassed, oppositively to the supply voltage 1, directly to the reference voltage 10. This other output stage is controlled by another analog circuit, referred to as the head actuator control circuit 5. Via connections 27 to 30 it supplies suitable command signals for moving the heads to the required positions for reading or writing digital information from/on the disk.

Another sensing resistor RS2 is inserted in series in a connection of the actuator 3, across which resistor a signal is produced which is indicative of the instantaneous value of the current through the actuator 3, which signal is amplified by another amplifier 15 and is subsequently applied to an input 16 of the control circuit 5.

During normal operation of the apparatus, i.e. when a nominal supply voltage is present on the line 1, control signals are transferred to the control circuit 4 via a set of connections 17 and to the control circuit 5 via another set of connections 18 from a digital control circuit, not shown in the Figure.

Since the invention relates more specifically to the power control of the drive motor 2 and the head actuator 3, the normal operation of the apparatus will not be described in detail, being known to those skilled in the art.

When the supply voltage is cut, this voltage decreases very rapidly to the reference voltage owing to the high power consumption of the apparatus. Currently, it is common practice to ensure that before the disk has stopped the heads are withdrawn to a safe position, which corresponds to a disk area where no information is stored and which can therefore not be damaged by contact of the heads with the disk surface when the disk slows down. This requires a substantial current for a time which is long enough to guarantee the complete withdrawal of the heads, even in the unfavorable case in which these heads would be accelerated in an opposite direction at the instant at which the power supply is cut.

The disk drive motor is then operated as a generator, utilizing its kinetic energy. To realize this function it is usually necessary to provide one or more isolating devices such as the diodes 11 and 12 in order to prevent the current supplied by the motor from returning to the supply line 1, which is then at zero volt.

A power monitoring circuit 6 causes a change of the mode of operation of the control circuits 4 and 5 as soon as a supply voltage drop below a fixed threshold is detected. In practice, two mode-change signals are used: one signal related to a threshold corresponding to the nominal voltage of +12 V and supplied via a connection 19, and the other signal related to a threshold corresponding to a nominal voltage of +5 V and supplied via a connection 20. A command to change the mode of operation is transmitted by the monitoring circuit 6 via a connection 9 common to the control circuits 4 and 5.

In order to maintain this function while the voltage of the supply line 1 drops rapidly, the monitoring circuit 6 is energized in a special manner from a storage capacitance 35, charged by the supply line 1 in the normal mode, via an anti-return diode 36.

The mode of operation which assures the withdrawal of the heads basically consists in setting all the switching elements S1 to S10 to their open position, except for one of them, for example the element S9. In this special mode of operation the actuator 3 is then energized by suitable means, which will be described hereinafter with reference to the following Figures.

Figure 2:
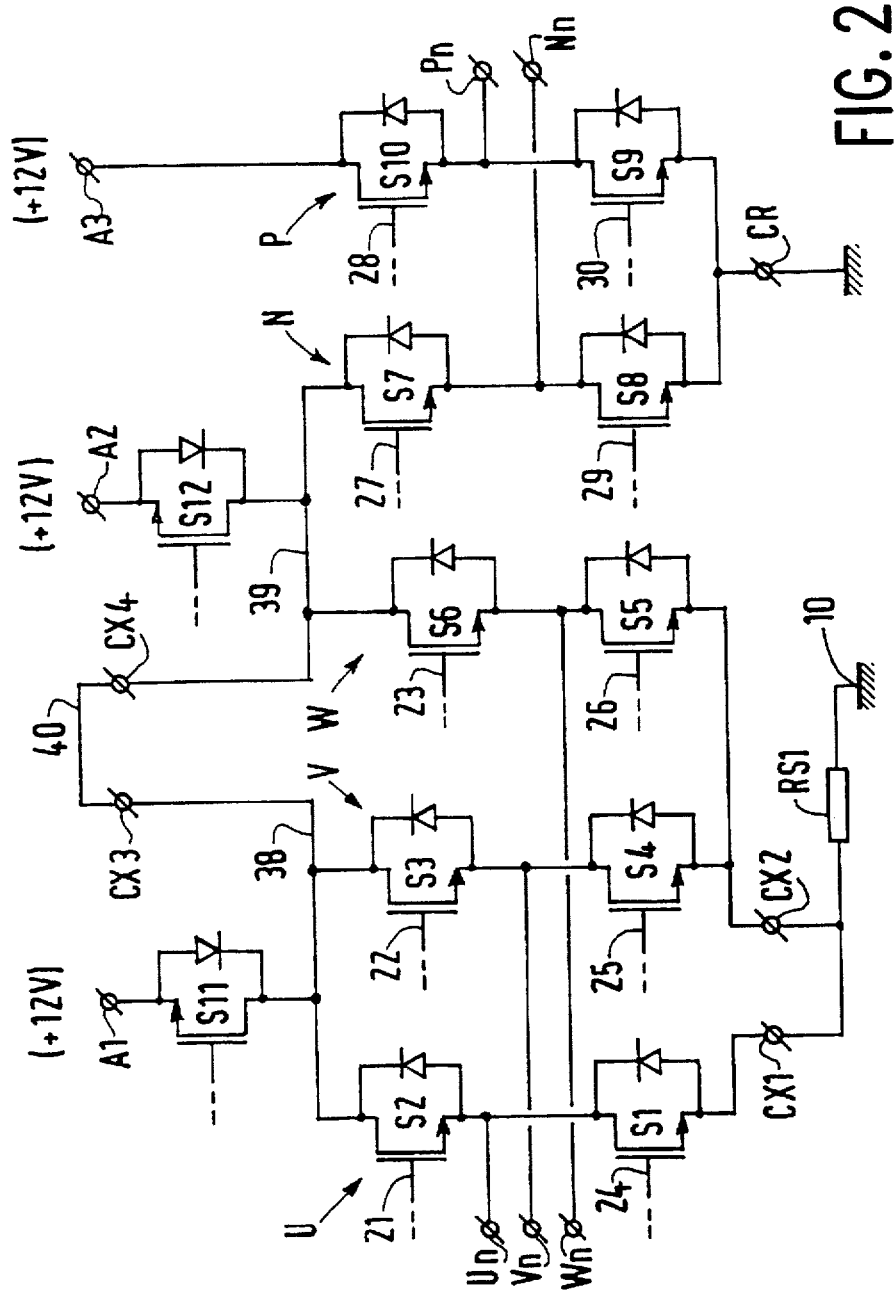
FIG. 2 is an electrical diagram of the power control integrated circuit in accordance with the invention.

FIG. 2 is a diagram showing the essential elements of the integrated circuit in accordance with the invention. These elements relate in particular to the power control of the disk drive motor and the actuator for moving the heads. In accordance with FIG. 1, six switching elements S1 to S6 form the power output stage for powering the drive motor, which is not shown in this Figure.

These switching elements S1 to S6 are preferably N-channel DMOS transistors, which in practice constitute the most suitable type of transistor for this application. Four other switching elements S7 to S10, also formed by DMOS transistors, constitute the power output stage which powers the head actuator, which is not shown in the present Figure. Using the same notation as in FIG. 1, these switching elements have been arranged in pairs forming three branches U, V, W for powering the drive motor and two branches N and P for powering the head actuator. The isolation with respect to the +12 V supply voltage is now provided by two DMOS transistors S11 and S12, which enable the series voltage drop in the power supply to be minimized. A conduction command for these transistors can be provided in a simple manner by the power monitoring circuit 6 shown in FIG. 1.

The power transistor S11 placed between a first supply voltage terminal A1 and the coupled ends of the branches U and V, which form a node 38 for the connection of the power supply of the drive motor.

The transistor S12, which operates as an isolating device, is connected between a second supply terminal A2 and one end of the branch W, which is also connected to the end of the branch N by a line 39. A third supply voltage terminal A3 is connected directly to one end of the branch P. The other end of the branch N and the other end of the branch P are both connected to a reference terminal CR of the circuit, which terminal is to be connected to the reference voltage. The other end of the branch U is connected to a first connection terminal CX1 of the circuit and the other end of the branch V, interconnected with the other end of the branch W, is connected to a second connection terminal CX2, which first and second connection terminals are to be brought at a voltage near the reference voltage. Outside the integrated circuit, these terminals are indeed connected to the reference voltage via a current sensing resistor RS1 for the current in the drive motor.

It is to be noted that, in this arrangement of the power transistors S1 to S10, the transistors are cascaded to form a continuous transistor chain. As will become apparent hereinafter, this advantageous arrangement enables these transistors to be arranged without interruption along the periphery of the semiconductor chip on which the circuit is integrated. The transistors S11 and S12, which serve as isolating devices with respect to the supply voltage, feed the branch U, V and the branch W, N, respectively.

In a preferred embodiment the node 38 between the transistor S11 and the transistors S2 and S3 is connected to a third connection terminal CX3, while the node 39 between the transistor S12 and the branches W and N is connected to a fourth connection terminal CX4, which terminals CX3 and CX4 are intended to be connected to one another by a connection 40 external to the integrated circuit. In this way, the positive voltage supply to the branches U, V, W and N is brought about via two connections and two switching transistors S11 and S12 in parallel, which reduces the required maximum current ratings of these switching transistors.

In the circuit arrangement shown in FIG. 2 it is to be noted that the transistors S11 and S12 are respectively coupled to only one node between two other transistors, i.e. the transistors S2 and S3 and the transistors S6 and S7. This feature of the circuit in accordance with the invention is advantageous in that it allows the output connections of the power transistors to be arranged so as to avoid any crossing and an excessive length of these connections, which would give rise to an undesirable parasitic resistance.

With respect to the operation of the circuit in the phase corresponding to the withdrawal of the heads to the safe position it is to be noted that the connections to the three windings of the drive motor via the central nodes Un, Vn and Wn of the branches U, V and W, respectively, include a conductive path in the direction of the nodes 38 and 39 owing to the intrinsic diodes of the DMOS transistors S2, S3 and S6. Conversely, the diodes in parallel with the transistors S1, S4 and S5 are poled in the reverse direction and prevent voltages produced by the drive motor in its generator mode from being drained to the reference voltage.

The source electrodes of the transistors S11 and S12 are disposed at the side of the supply terminals A1 and A2, respectively, in such a manner that the intrinsic diodes in parallel with these transistors isolate the nodes 38 and 39 from the supply terminals A1 and A2. As a result, a positive ripple voltage appears on the nodes 38 and 39, which as stated hereinbefore are coupled by the connection 40. To the energizing of the head actuator from the intermediate node Nn of the branch N can be achieved by turning on the transistor S7, thereby allowing energy recovered in the form of a current on the node 39 to be transferred to the head actuator. The transistor S9 is driven into conduction to return this current to the reference voltage. This method of energizing the head actuator during the withdrawal to the safe position requires dual control of the transistor S7, depending on whether a normal phase of operation or a phase of withdrawal of the heads to the safe position occurs.

Figure 3:
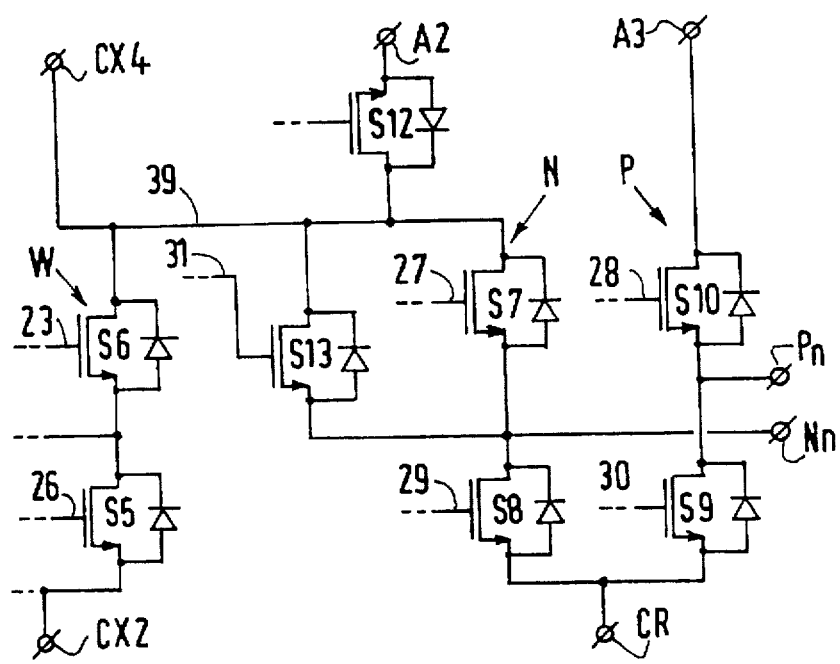
FIG. 3 is a diagram of a part of the circuit of FIG. 2, showing a variant of the invention.

In order to avoid such a complication, a simpler configuration is possible in accordance with the invention, in which an additional transistor S13, also of the N-channel DMOS type but having a smaller area than the other power transistors owing to the smaller currents prevailing in this transistor, has been provided in order to obtain a conduction path between the node 39 and the intermediate node Nn of the branch N at the appropriate instant. This configuration is shown in FIG. 3, which shows that part of FIG. 2 which includes the transistors S5 to S10 and the transistor S12.

In this embodiment the command applied to the transistor S7 at the instant of withdrawal of the heads is a turn-off command, whereas the command applied to the additional transistor S13 from a connection 31 to the control circuit 4 for the drive motor (FIG. 1) is a command to obtain conduction only during the withdrawal of the heads until the disk has stopped. In an advantageous variant the command for the transistor S13 is modulated so as to first obtain conduction with a controlled voltage during a minimum time necessary for the withdrawal of the heads to the safe position, after which this command is changed to render the transistor highly conductive in order to brake the drive motor.

Figure 4:
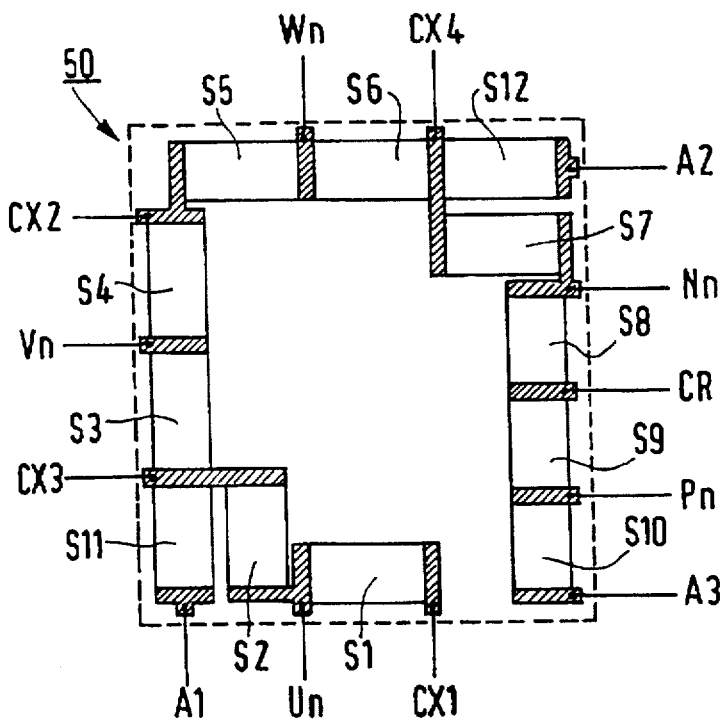
FIG. 4 is a plan view of a semiconductor chip, showing a practical example of the layout of the power switching elements corresponding to the diagram of FIG. 2.

FIG. 4 is a highly diagrammatic plan view of a semiconductor chip 50 on which the power transistors S1 to S10 are arranged, which transistors, as is shown are connected to one another in a regular manner, forming a continuous chain in which the connections are of minimal lengths. In this chain the transistors S11 and S12 are included as isolating elements, preferably disposed in a corner of the semiconductor chip so as to again minimize the lengths of the connections used for the conditional access of the supply voltage to the rest of the transistor chain.

As can be seen, the layout of the circuit in accordance with the invention makes it possible to achieve an optimum arrangement of the transistor at the periphery of the circuit, at which location these transistors are apt to produce the minimal parasitic resistance in the various supply loops of the circuit in accordance with the invention.

What is claimed is:

1. An integrated circuit for controlling an information storage apparatus, which apparatus comprises:

a rotary disc including read-write heads, a three-phase motor which provides the rotary drive for the disk, a head actuator for moving the read-write heads of the disk, the integrated circuit including a circuit that manages, on the basis of a supply voltage and a reference voltage, a sequential control of the phases of the three-phase motor and the positioning of the head actuator, the circuit comprising a plurality of power switching elements arranged along the periphery of a semiconductor chip on which said circuit is integrated, which elements are arranged so as to form:

three branches U, V, W, each comprising two switching elements arranged in series between two terminals, which energize each of the phases of the three phase motor via the intermediate nodes between said elements of these branches, and two branches P and N, each comprising two switching elements arranged in series between two terminals, which branches energize the head actuator via the intermediate nodes between said elements of these branches, which circuit further comprises at least one isolating device for insulating one branch of switching elements from the supply voltage in the case of a cut in said supply voltage, in order to allow the read-write heads to withdraw to a safe position, the head actuator then being energized by means of electric energy generated by the three-phase motor, characterized in that:

an eleventh switching element functioning as an isolating device is connected between a first supply terminal and the coupled ends of the two branches U and V, the eleventh switching element receiving the supply voltage, a twelfth switching element functioning as an isolating device is connected between a second supply terminal and an end of the branch W which has been coupled to an end of the branch N, the twelfth switching element receiving the supply voltage, a third supply voltage terminal is connected directly to one end of the remaining branch P, the other end of the branch N and the other end of the branch P are connected together to a reference terminal of the circuit, the reference terminal receiving the reference voltage, the other end of said branch U is connected to a first connection terminal of the circuit, while the other end of the branch V and the other end of the branch W are connected together to a second terminal of the circuit, which first and which second connection terminal are to be brought at a voltage near the reference voltage.

2. An integrated circuit as claimed in claim 1, characterized in that the node coupling the eleventh switching element to the branches U and V is connected to a third connection terminal of the circuit, and the node coupling the twelfth switching element to the branches W and N is connected to a fourth connection terminal of the circuit, which terminal is to be connected to the third connection terminal by a connection external to the integrated circuit.

3. An integrated circuit as claimed in claim 2, characterized in that the node coupling the twelfth switching element to the coupled ends of the branches W and N is coupled to the intermediate node between the elements of the branch N via the current path of an additional switching element under the influence of a command which causes its conduction only during the withdrawal of the heads until the disk has stopped.

4. An integrated circuit as claimed in claim 3, characterized in that the switching elements are transistors of the N-channel DMOS type.

5. An integrated circuit as claimed in claim 4, characterized in that the transistor forming the additional switching element, referred to as the thirteenth transistor, receives a conduction command which has been modulated so as to obtain a conduction with a controlled voltage during a given time necessary for the withdrawal of the heads to the safe position, after which this command is changed to place the transistor in a highly conductive state in order to brake the disk drive motor.

6. An integrated circuit as claimed in claim 2, characterized in that the switching elements are transistors of the N-channel DMOS type.

7. An integrated circuit as claimed in claim 6, characterized in that the transistor forming the additional switching element, referred to as the thirteenth transistor, receives a conduction command which has been modulated so as to obtain a conduction with a controlled voltage during a given time necessary for the withdrawal of the heads to the safe position, after which this command is changed to place the transistor in a highly conductive state in order to brake the disk drive motor.

8. An integrated circuit as claimed in claim 1, characterized in that the switching elements are transistors of the N-channel DMOS type.

9. An integrated circuit as claimed in claim 8, characterized in that the transistor forming the additional switching element, referred to as the thirteenth transistor, receives a conduction command which has been modulated so as to obtain a conduction with a controlled voltage during a given time necessary for the withdrawal of the heads to the safe position, after which this command is changed to place the transistor in a highly conductive state in order to brake the disk drive motor.

* * * * *